(12) United States Patent
Domenichiello

(10) Patent No.: US 10,555,627 B1
(45) Date of Patent: Feb. 11, 2020

(54) INFLATABLE PICTURE FRAME

(71) Applicant: Peter Domenichiello, Mississauga (CA)

(72) Inventor: Peter Domenichiello, Mississauga (CA)

( * ) Notice: Subject to any disclaimer, the term of this patent is extended or adjusted under 35 U.S.C. 154(b) by 0 days.

(21) Appl. No.: 16/405,394

(22) Filed: May 7, 2019

(51) Int. Cl.
| | |
|---|---|
| *A47G 1/06* | (2006.01) |
| *A47G 1/14* | (2006.01) |
| *G03B 21/585* | (2014.01) |
| *A63H 27/10* | (2006.01) |

(52) U.S. Cl.
CPC ............ *A47G 1/0616* (2013.01); *A47G 1/14* (2013.01); *A63H 27/10* (2013.01); *G03B 21/585* (2013.01)

(58) Field of Classification Search
CPC .......... A47G 2001/0694; A47G 1/0616; A47G 1/14; A47G 1/142; A47G 1/143; A63H 3/06; A63H 27/10; A63H 2027/1075; A63H 2027/1091; G03B 21/585
See application file for complete search history.

(56) References Cited

U.S. PATENT DOCUMENTS

| | | | |
|---|---|---|---|
| 3,589,047 A | 6/1971 | Hess | |
| 3,686,782 A | 8/1972 | Erickson | |
| 3,771,247 A | 11/1973 | De Harak | |
| 5,402,591 A | 4/1995 | Lee | |

*Primary Examiner* — Cassandra Davis
(74) *Attorney, Agent, or Firm* — Vincent G. LoTempio; Kliss, Stenger & LoTempio; David T. Stephenson

(57) ABSTRACT

An inflatable picture frame shaped to have the appearance of a conventional picture frame. In an inflated position, the inflatable picture frame will have the contours of a conventional picture frame and a bottom member angled to a front position for front support, and legs that fasten in a rear position to form a linked rear support. A flat and rigid transparent central portion contains a sleeve in which to place a picture or card. A system for attaching an inflatable picture frame to a wall comprising an adhesive folding box attached to a recess in a back portion of the inflatable picture frame which may then be attached to a support structure.

19 Claims, 8 Drawing Sheets

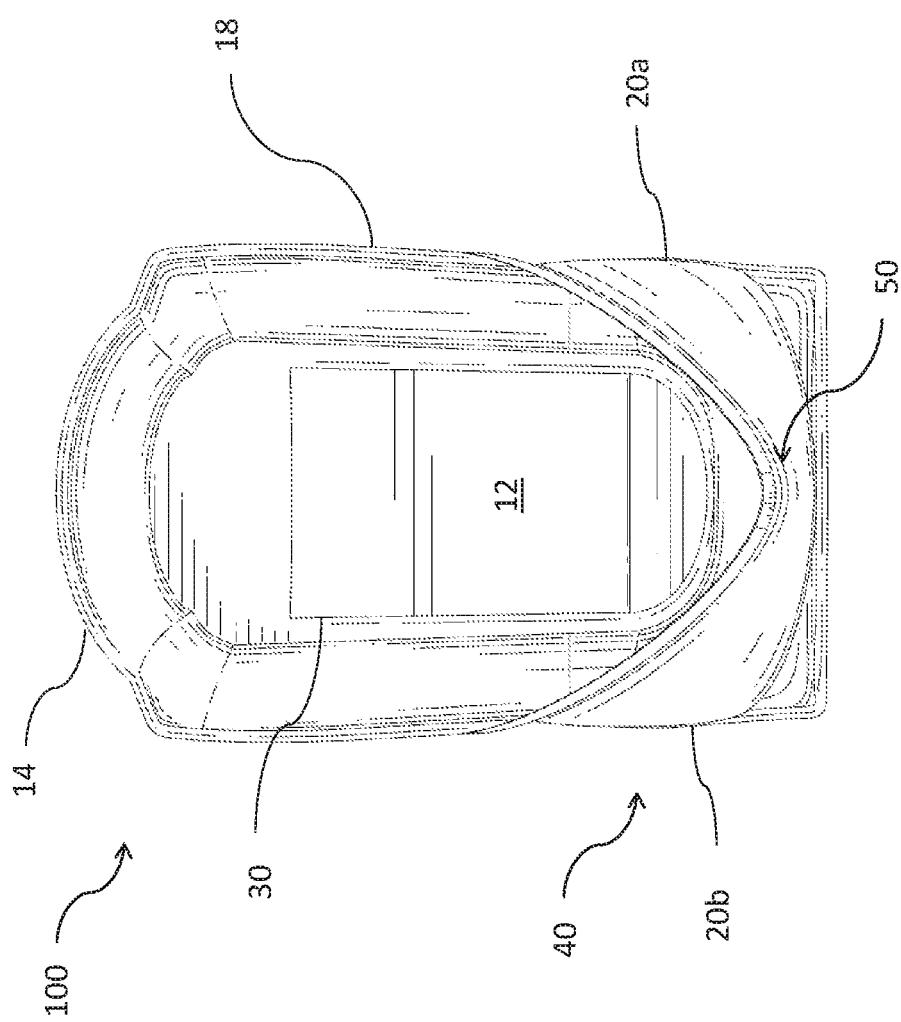

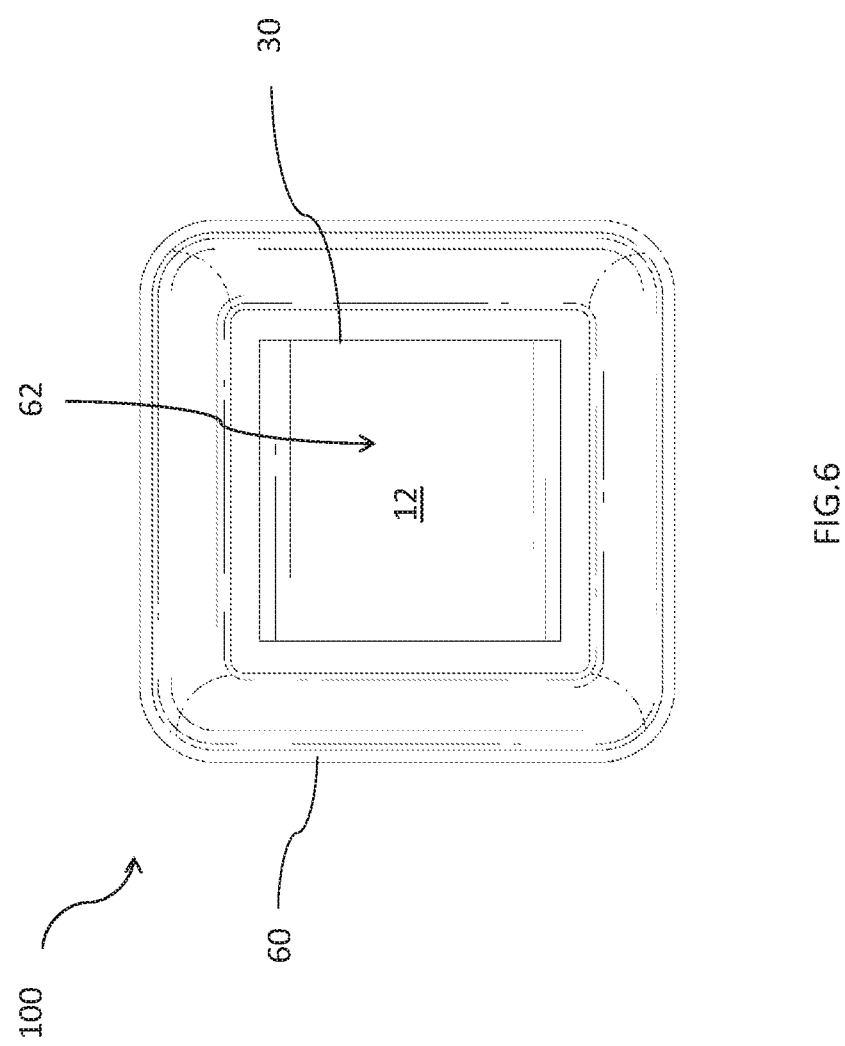

INFLATABLE PICTURE FRAME

BACKGROUND

The present disclosure relates to a frame for pictures and more particularly to a fully inflatable, self-supporting picture frame.

Picture frames have been supported by various rigid, mechanical supports. Such frames may be costly, heavy and difficult to transport. With picture frames, which are periodically moved, damage may occur, the weight of the frame is an important cost concern for delivery to retailers. Accordingly, it is an object of the present disclosure to provide a new and novel lightweight, inexpensive picture which is easy to transport, erect, and dismantle.

A picture frame, which is inflatable and deflatable, can be compacted into a relatively small volume for storage and transfer. Inflatable signs have been provided heretofore such as a balloon, or other such inflatable device, having an advertisement written thereon. One such expandable balloon is illustrated in U.S. Pat. Nos. 5,024,012 and 5,031,299. Such an expandable balloon has the advertising displayed thereon and is not utilized as a support for a separate sign. Another inflatable sign of a similar type is disclosed in U.S. Pat. No. 4,776,121. However, there is a need for an inflatable frame for a picture.

SUMMARY

The present disclosure relates to an inflatable picture frame shaped to have the appearance of a conventional picture frame. In an inflated position, the inflatable picture frame will have the contours of a conventional picture frame and a bottom support angled to a front position for front support, and legs that fasten in a rear position to form rear support. A flat and rigid central portion contains a sleeve in which to place a picture or card. In one embodiment, a rectangular inflatable picture frame without legs is shown. In this embodiment, inflatable picture frame includes a front and back recess surrounded by inflatable rectangular portion. The inflatable rectangular portion is generally symmetrical and encloses inner member.

The invention of the application will be further understood by reference to the specification taken in conjunction with the accompanying drawings in which:

BRIEF DESCRIPTION OF THE DRAWINGS

FIG. 5 shows a rear view of the inflatable picture frame of the present disclosure in an inflated condition.

FIG. 6 show a front view of a rectangular inflatable picture frame of the present disclosure;

DETAILED DESCRIPTION

Figure 1:
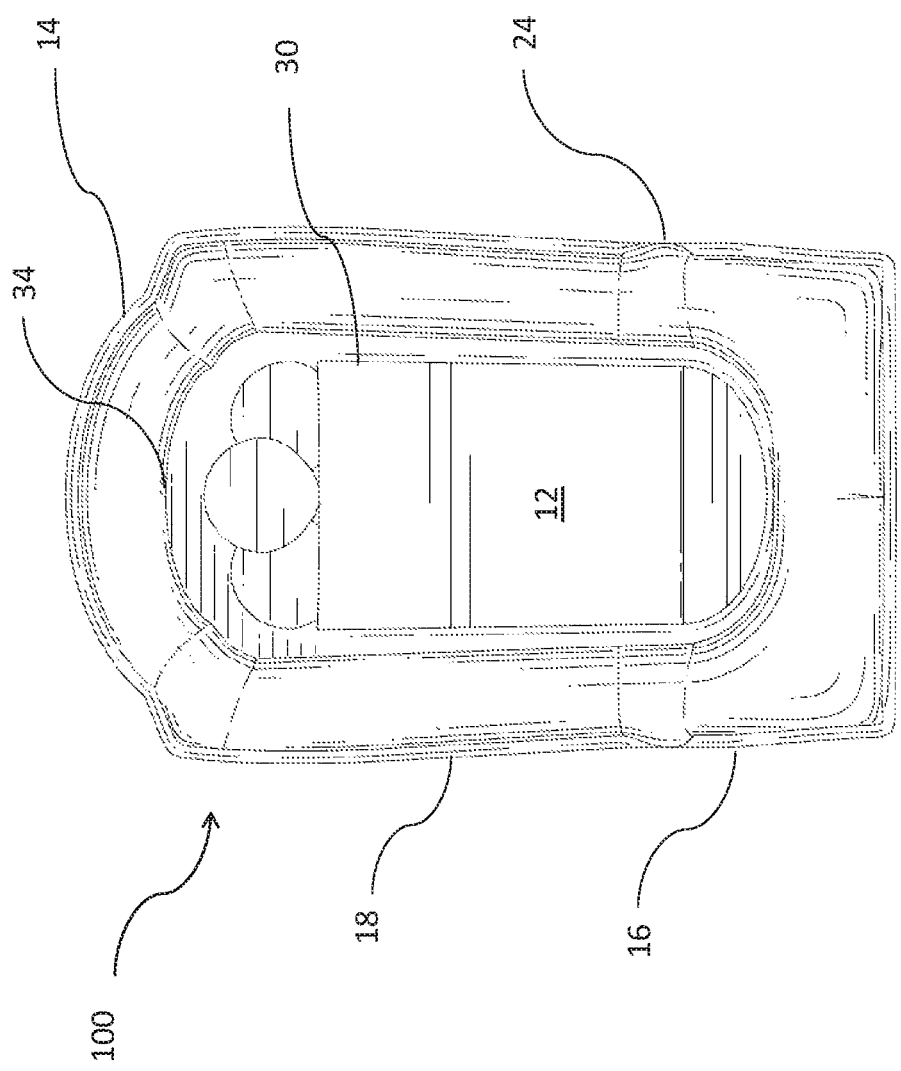
FIG. 1 a front view of the inflatable picture frame of the present disclosure in an inflated condition with legs connected.

Referring to the drawings and more particularly to FIG. 1, there are shown air or fluid impervious material that form members of the inflatable picture frame. The material may be translucent, transparent or opaque, wherein in one embodiment the inflatable picture frame 100 allows a view of anything disposed within the inflatable picture frame 100. Inflatable picture frame 100 be made of a flexible material such as foil, plastic, rubber, latex, polychloroprene, nylon fabric, polyvinylchloride, polyethylene or other suitable material.

Components of inflatable picture frame 100 are illustrated in an inflated position in FIG. 1. FIG. 1 illustrates a front view of inflatable picture frame 100. Inner member 12, which may be a picture, illustration or other illustration may be comprised of paper or other material capable of displaying an image, as would be known to one of ordinary skill in the art. The material for inner member 12 may be rigid or flexible. Inner member 12 is held in place within a sleeve 30. Sleeve 30 may preferably open at the top or bottom of the sleeve to receive inner member 12. Sleeve 30 may be comprised of a transparent plastic material, and may be transparent on both sides or transparent on a front side and opaque on a back side.

In some embodiments, sleeve 30 may open on a side. Vertically above sleeve 30 is a flat insertion portion 34, which allows for insertion of inner member 12 without interference from top member 14. Flat insertion portion 24 may be of a sufficient height and width to allow insertion of inner member 12 into sleeve 30 without contacting top member 14 or side member 18. The width of sleeve 30 is slightly smaller than the width between side members 18. Bottom member 16 may be connected to side member 18 through lower transition portion 24. Side member 18 may be connected to top member 26 through upper transition portion 26.

Member border 32 may delineate a border between top member 26 and side member 18, as well as between other transition portions and the top member 14, bottom member 16 and side members 18. Member border 32 may be designed to impart the appearance of a conventional wood or plastic frame, as may be carved or molded into an ornate shape. Each member may be tubular and cylindrical in shape and structure. Each member may have divisions to separate structural portions of inflatable picture frame 100. Preparation of material used for sheets in the present disclosure may be designed to create a member border that decrease area or volume at certain portions of the present disclosure to impart the appearance of a conventional wood or plastic picture frame, using such methods as would be known to one of ordinary skill in the art.

Figure 2:
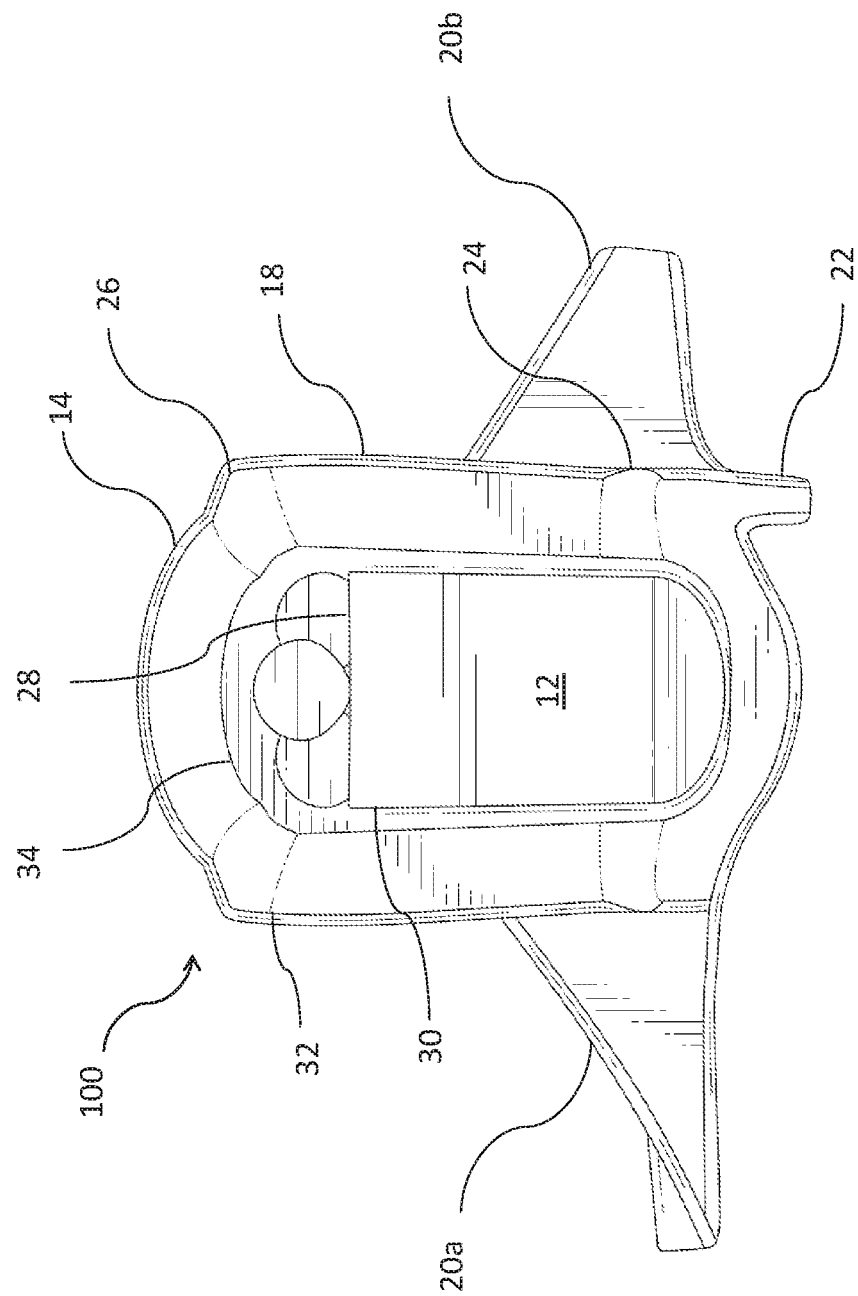
FIG. 2 shows a rear view of the inflatable picture frame of the present disclosure in a deflated condition with legs extended.

Valve 30, which has been shown for purposes of illustration in FIG. 2, permits egress and ingress of air or other fluid. In one embodiment, inflatable picture frame 100 may be inflated with a gas, which may be air or a gas lighter than air such as helium, or a fluid, wherein the fluid may be water, and may be comprised of material such as foil, as would be typically used with balloons. The placement of valve 22 is designed to minimize visibility of valve 22, as well as allow for ease of inflation, as its placement allows it to be concealed to a viewer. Placement of valve 22 may be, in one embodiment, on the rear portion of bottom member 16.

Valve 22 may be position on the rear portion of bottom member 16 below side member 18 and adjacent to leg 20a or 20b. In this embodiment, legs 20a and 20b may then be wrapped around valve 22 after inflation of inflatable picture frame 100 in order to conceal valve 22 as well as to form a support for inflatable picture frame. The use of two legs 20a and 20b, rather than a single loop formation, for a support allows for improved access to valve 22 for inflation and deflation, as a single loop design would interfere with access to valve 22. Further, a single loop design, as opposed to legs 20a and 20b, would create a design that would be more susceptible to snagging when inflatable picture frame 100 was in a deflated position during storage and transport. Any desirable valve 22 may be employed, as would be known to one of ordinary skill in the art.

Figure 3:
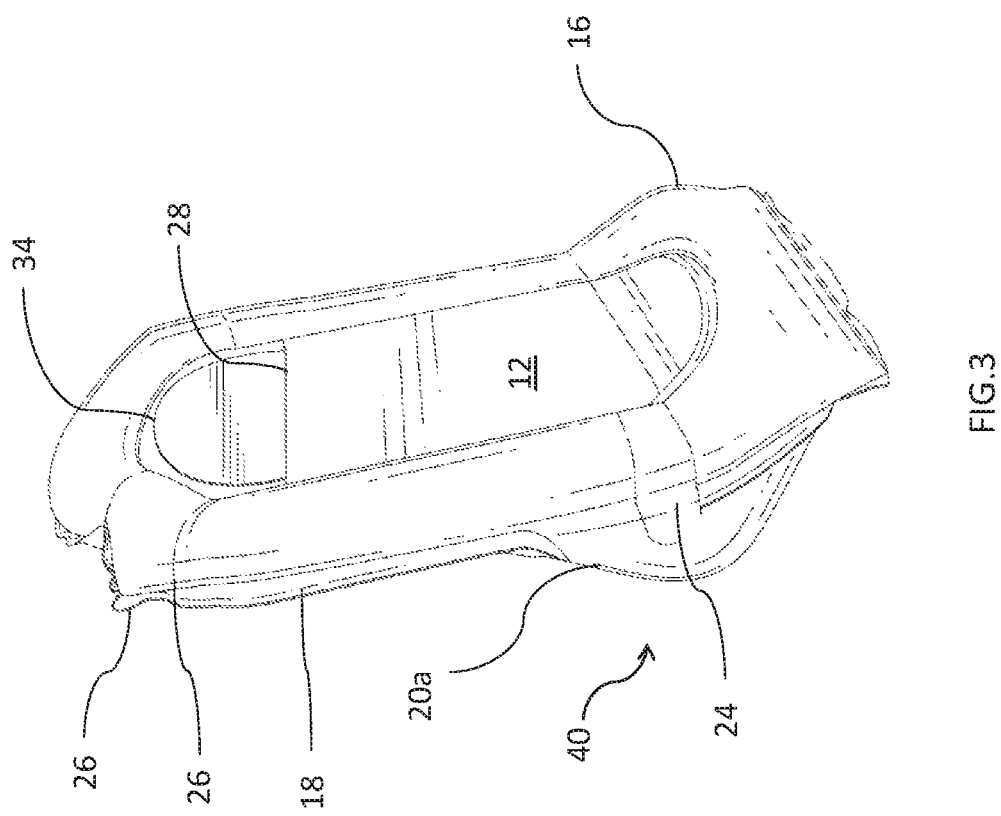
FIG. 3 shows a perspective side view of the inflatable picture frame of the present disclosure in an inflated condition.
Figure 4:
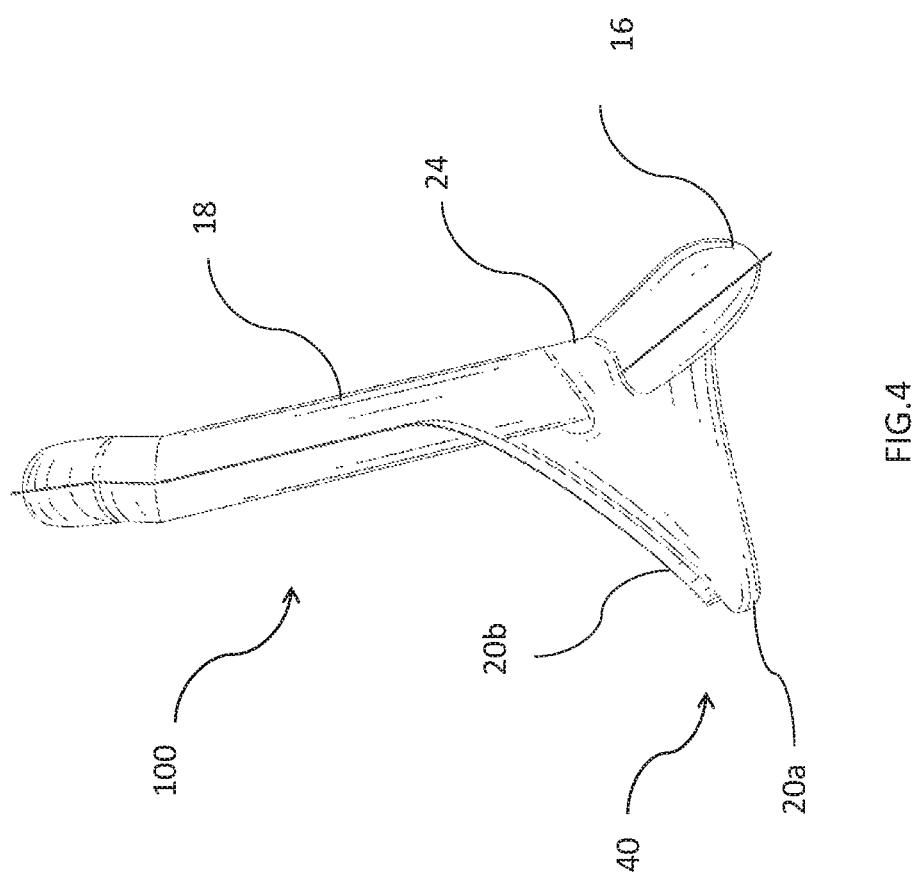
FIG. 4 shows a side view of the inflatable picture frame of the present disclosure in an inflated condition.

Upon inflation of inflatable picture frame 100, members of inflatable picture frame 100 will be forced or pushed outward as illustrated in FIGS. 3-5. With regard to FIG. 3, bottom member 16 will be pushed outward at an angle in the direction of the front of inflatable picture frame 100. The angle may be such that it is sufficient to stabilize support of inflatable picture frame 100 in conjunction with support 40. The angle of bottom member 16, when inflated, with respect to a vertical plane may be between 20 degrees and 60 degrees.

With further regard to FIG. 3, leg 20a is shown connected with leg 20b to form support 40. Support 40 is formed by connecting the ends of legs 20a and 20b. This is seen more clearly in FIGS. 4 and 5. With regard to FIG. 4, legs 20a and 20b are pulled toward the back side of inflatable picture frame 10. The legs 20a and 20b may, in one embodiment form a triangular shape, where a first side of leg 20a, for example, may be connected to side member 18 above lower transition portion 24, while the other end of the first side of leg 20a terminates at a flat placement surface, such as the top surface of a desk or cabinet. A second side of leg 20a may be connected to bottom member 16, below lower transition portion 24, and extend to meet the first side of leg 20a at the vertex terminating at the flat placement surface.

FIG. 5 shows a rear view of inflatable picture frame 10. Legs 20a and 20b can be seen connected at fastener 50. Fastener 50 may be by means of hook and loop fasteners, snaps, adhesive or any other means known to one of ordinary skill that allow leg 20a to attach to leg 20b to form the support.

While several configurations of an inner member 12 are shown in the drawings, it is appreciated that inner members having various shapes, either symmetrical or asymmetrical, can be employed. For example, a triangle, rectangle or oval shape inner member could be employed. In one embodiment, text may be printed on an opaque inner member. Text printed on the opaque inner member may be in the form of a greeting card.

With regard to FIG. 6, a rectangular embodiment of the present disclosure without legs is shown. In this embodiment, inflatable picture frame 100 includes front recess 62 surrounded by inflatable rectangular portion 60. Inflatable rectangular portion 60 is generally symmetrical and encloses inner member 12.

Figure 7A:
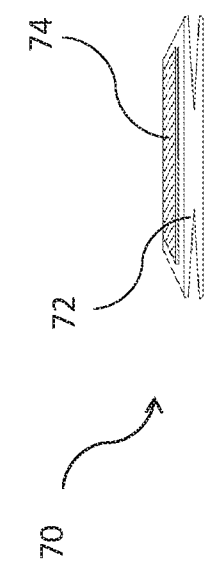
FIGS. 7A-7C show a top view of an adhesive folding box of the present disclosure in various configurations.
Figure 7B:
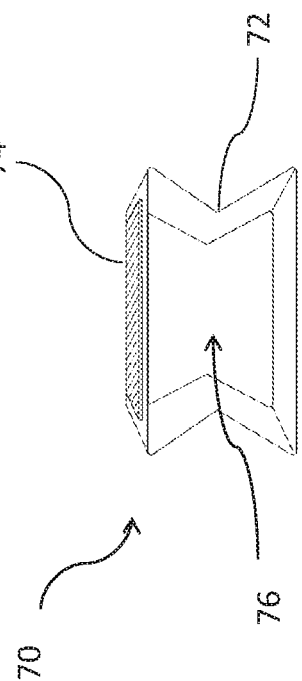
Figure 7C:
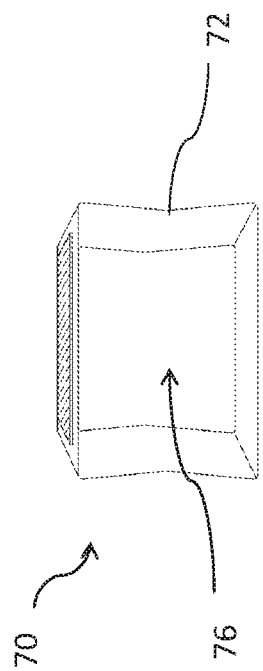

FIGS. 7A-7C show an adhesive folding box 70. In some embodiments, the folding box may be comprised of paper, but of other materials capable of being folded and extended, as would be known to one of ordinary skill in the art. Adhesive folding box 70 unfolds centrally to create and when folded central fold 72 folds inward such that the sides of adhesive folding box fold underneath the sides having an adhesive surface 74. A central opening 76 is formed when adhesive folding box is opened. Central opening 76 is vertically oriented for purposes of rigidity and stability.

The adhesive may be a double-sided tape that is capable of holding an inflatable picture frame 100 to a wall. In another embodiment, the adhesive may be applied directly to adhesive folding box 70 to provide adhesive surface 74. In one embodiment, the adhesive may be a removable wall mounting tab, as would be known to one of ordinary skill in the art. The adhesive folding box 70 is comprised of a semi-rigid paper capable of being folded and capable of holding an inflatable frame in place.

Figure 8C:
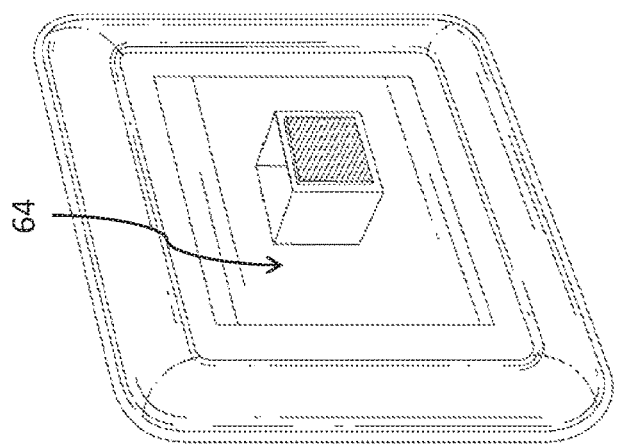
FIGS. 8A-8C show a perspective view of the inflatable picture frame of the present disclosure including the adhesive folding box in various configurations.
Figure 8B:
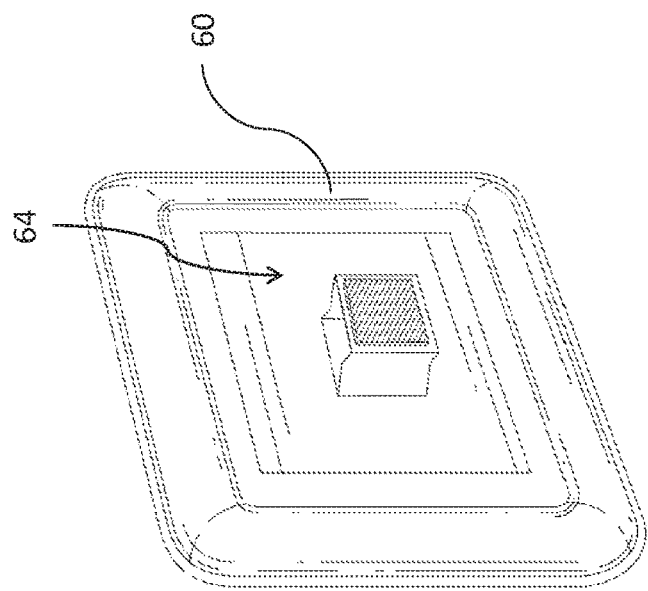
Figure 8A:
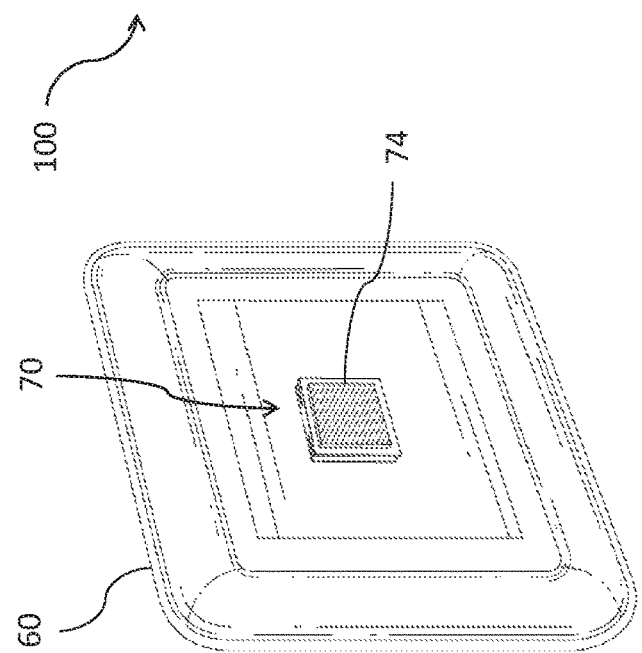

FIGS. 8A-8C show inflatable picture frame 100 with adhesive folding box 70 attached. Adhesive folding box 70 is attached to back recess 64. Back recess 64, in one embodiment, is generally rectangular has a depth that forms an essentially flat inner member 12 that is capable of holding a picture with front recess 62. In one embodiment, back recess 64 has a depth that is approximately half the depth of inflatable rectangular portion 60. Front recess 62 is likewise half the depth of inflatable rectangular portion 60, thereby forming a generally symmetrical pair of recesses on each side of inflatable picture frame 100.

FIG. 8C shows that the extended form of adhesive folding box 70 has a greater depth than back recess 64, such that when adhesive folding box 70 extends out of back recess 64 to contact a support structure such as a wall. Back recess 64 and front recess 62 may be of alternative shapes, and not only rectangular. Here, a first adhesive surface 74 contacts a back portion of inner member 12 through back recess 64. A second adhesive surface 74 contacts a support when adhesive folding box 70 is fully extended. By this means, the adhesive folding box 70 holds the inflatable picture frame 100 to the wall.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims. All documents cited in the Detailed Description of the invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

The invention claimed is:

1. A picture frame comprising: a hollow, air impervious, inflatable casing, wherein a casing includes a bottom member extending from a left side of the picture frame to a right side of a picture frame, the bottom member being angled away from two side members in a forward direction;
   the bottom member extending between and in fluid communication with the two side members;
   the two side members extending vertically from the bottom member to a top member:
   the two side members being in fluid communication with the top member;
   the top member extending horizontally between the two side members;
   each side member attached to and in fluid communication with a leg;

a non-inflatable vertical flat portion between the top member, the two side members and the bottom member;
the non-inflatable vertical Hat portion containing a sleeve;
the sleeve extending between the two side members, the top member and the bottom member;
the sleeve containing a sleeve opening for receiving an inner member; and
a distal vertex of each leg including a fastener portion, wherein the fastener portion is configured to connect to a corresponding fastener portion on an opposite leg.

2. The picture frame of claim 1, wherein the bottom member is rectangular.

3. The picture frame of claim 1, further comprising the leg being triangular and extending back to a distal vertex.

4. The picture frame of claim 1, wherein a valve is located behind the bottom member and within a horizontal plane of a support, wherein the support is formed by each leg being connected with a fastener to form a generally ring-shaped support surrounding the valve.

5. The picture frame of claim 1, further comprising adjacent the sleeve opening is a flat insertion portion, wherein the flat insertion portion separates at least one of a top member or bottom member from the sleeve opening such that the inner member may be inserted into the sleeve without contacting the at least one of the top member or the bottom member.

6. The picture frame of claim 1, wherein each leg tapers towards a rear of the picture frame.

7. A picture frame comprising:
a hollow, air impervious, inflatable casing, wherein a casing includes a bottom member extending from a left side of the picture frame to a right side of a picture frame;
the bottom member being angled away from two side members in a forward direction;
the bottom member being rectangular; the bottom member extending between the two side members;
the bottom member being in fluid communication with the two side members;
the two side members extending vertically from the bottom member to a top member;
the two side members being in fluid communication with the top member;
the top member extending horizontally between the two side members;
each side member each attached to and in fluid communication with a leg;
the leg being triangular and extending back to a distal vertex;
the distal vertex of each leg including a fastener portion, wherein the fastener portion is configured to connect to a corresponding fastener portion on an opposite leg;
a non-inflatable flat portion between the top member, the two side members and the bottom member;
the non-inflatable flat portion containing a sleeve; the sleeve extending between the two side members;
the sleeve containing a sleeve opening for receiving an inner member;
adjacent the sleeve opening is a flat insertion portion, wherein the flat insertion portion separates at least one of a top member or bottom member from the sleeve opening such that the inner member may be inserted into the sleeve without contacting the at least one of the top member or the bottom member.

8. The picture frame of claim 7, wherein an angle formed by the bottom member, when the picture frame is inflated, with respect to a vertical plane may be between 20 degrees and 60 degrees.

9. The picture frame of claim 7, further comprising two upper transition portions, wherein the two upper transition portions have borders of a diameter less than that of the two upper transition portions, and further comprising two lower transition portions, wherein the two lower transition portions have borders of a diameter less than that of the two lower transition portions.

10. The picture frame of claim 7, further comprising a valve positioned in a back portion of the bottom member.

11. The picture frame of claim 7, wherein a lower transition portion is an inflated hinge.

12. The picture frame of claim 7, wherein an angle between a longitudinal axis of the bottom member and the longitudinal axis of a duality of legs is approximately 90 degrees.

13. The picture frame of claim 7, wherein the sleeve opening is on a rear of the non-inflatable flat portion.

14. The picture frame of claim 7, wherein a flat insertion portion is semi-circular.

15. The picture frame of claim 7, wherein the flat insertion portion and the sleeve are rigid.

16. The picture frame of claim 7, wherein each leg is integral with the two side members, a set of lower transition portions and the bottom member.

17. The picture frame of claim 7, wherein each leg is integral with at least two side members, a set of lower transition portions and the bottom member; wherein each leg tapers to a vertex; and wherein each leg wraps around a rear portion of the picture frame and fasten to conceal a valve.

18. A system for an inflatable picture frame comprising:
a hollow, air impervious, inflatable casing, wherein a casing includes an inflatable rectangular portion extending from a left side of the picture frame to a right side of the inflatable picture frame and a bottom of the inflatable picture frame to the top of the inflatable picture frame;
the bottom of the inflatable rectangular portion is in fluid communication with the top of the inflatable picture frame;
the bottom of the inflatable picture frame and the top of the inflatable picture frame are in fluid communication two side members of the inflatable picture frame;
the two side members extending vertically from the bottom member to a top member;
the two side members being in fluid communication with the top member;
the top member extending horizontally between the two side members;
each side member attached to and in fluid communication with a leg;
a non-inflatable vertical flat portion containing a sleeve;
the sleeve extending between the two side members, the top member and the bottom member;
the sleeve containing a sleeve opening for receiving an inner member;
a front recess and a back recess;
an adhesive folding box, wherein the adhesive folding box has a front side, a back side, a left side, and a right side;
wherein an adhesive folding box has a vertical central opening;
wherein the adhesive folding box has a central fold on the left side and a central fold on the right side such that the adhesive folding box can fold flat and be extend outward to form a rectangle;

wherein the front side has a front adhesive surface;

wherein the back side has a back adhesive surface;

wherein the front adhesive surface is attached to the sleeve with the back recess;

wherein the back adhesive surface is configured to attach to a support structure; and wherein the adhesive folding box is sufficiently rigid to support the inflatable picture frame when attached to the support structure.

19. The system for an inflatable picture frame of claim 18, wherein the adhesive folding box is comprised of paper.

* * * * *